May 18, 1948.  T. S. GERSPACHER ET AL  2,441,698
MULTIPLE OUTLET MOLDING
Filed Dec. 13, 1946    2 Sheets-Sheet 1
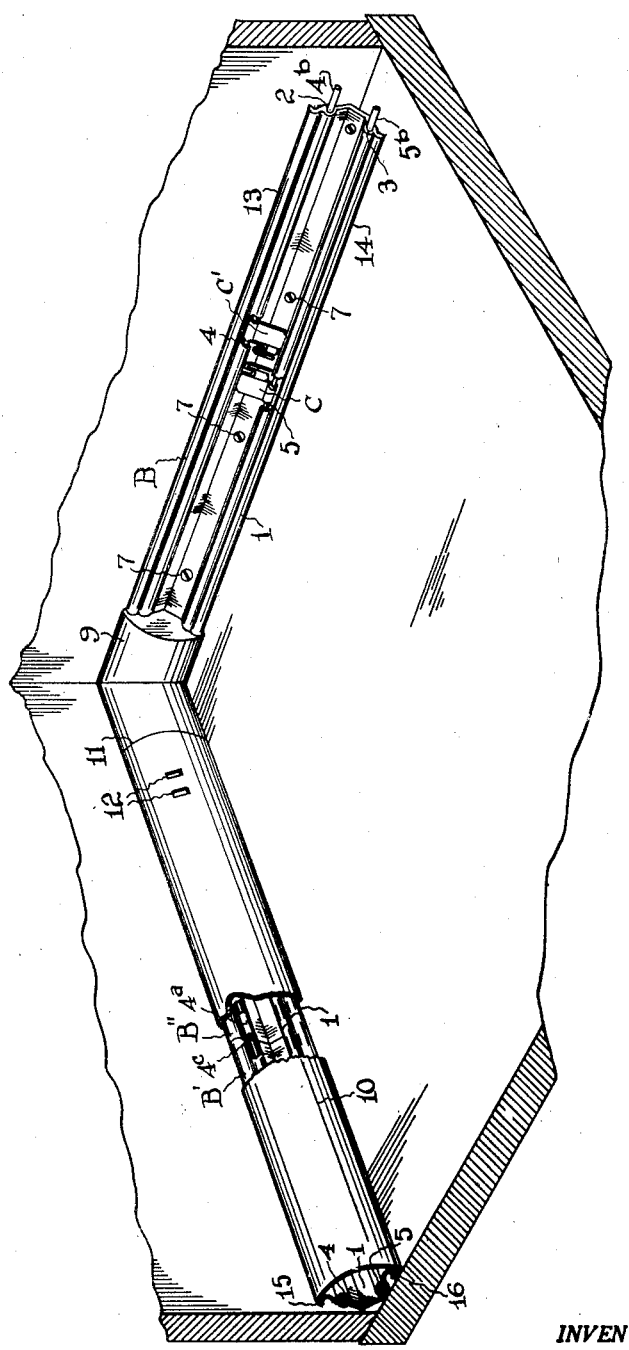
INVENTORS.
THOMAS S. GERSPACHER
FREDERICK A. MAYNARD
BY Bosworth & Sessions
ATTORNEYS May 18, 1948.   T. S. GERSPACHER ET AL   2,441,698
MULTIPLE OUTLET MOLDING
Filed Dec. 13, 1946   2 Sheets-Sheet 2
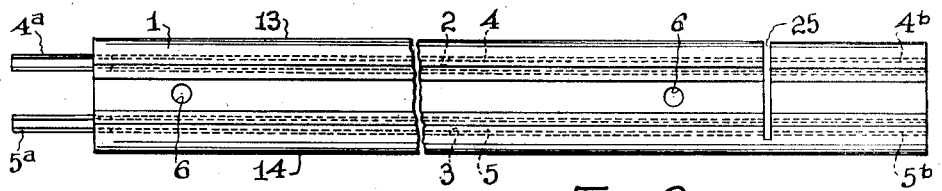
Fig. 3
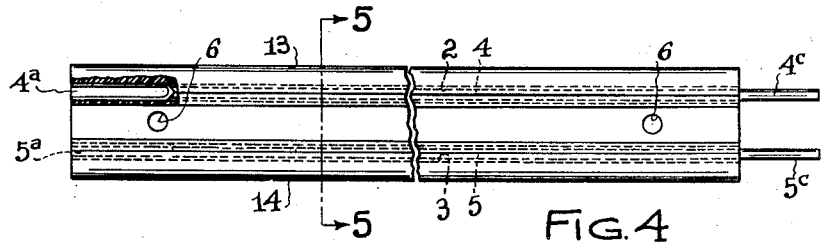
Fig. 4
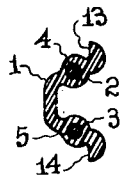 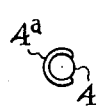  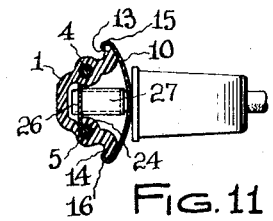
Fig. 5   Fig. 7   Fig. 6   Fig. 11
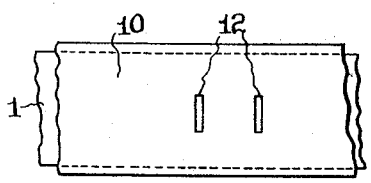 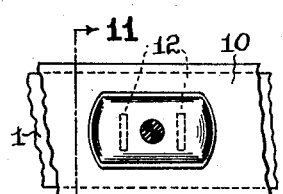 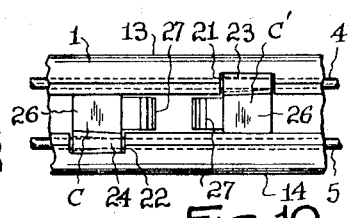
Fig. 8   Fig. 9   Fig. 10
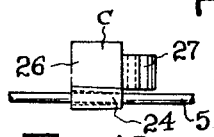 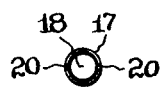 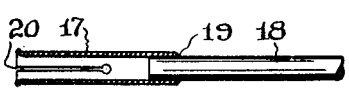
Fig. 12   Fig. 15   Fig. 14
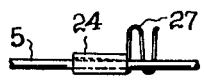
Fig. 13
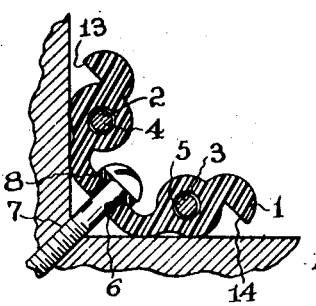
Fig. 16
INVENTORS.
THOMAS S. GERSPACHER
FREDERICK A. MAYNARD
BY Bosworth & Sessions
ATTORNEYS.

Patented May 18, 1948

2,441,698

UNITED STATES PATENT OFFICE 2,441,698

MULTIPLE OUTLET MOLDING

Thomas S. Gerspacher and Frederick A. Maynard, Cleveland, Ohio

Application December 13, 1946, Serial No. 715,946

2 Claims. (Cl. 173—334.1)

This invention relates to multiple outlet electrical moldings and more particularly to an improved form of molding unit for use in building construction whereby a number of conveniently located electrical outlets can be installed with a minimum of labor and expense, either in existing structures or new building construction.

Various types of electrical moldings have been proposed which, when installed in a building around the walls thereof either at the junction of the walls and the floor or at some point above this junction, provide a series of spaced electrical outlets to which various devices such as lamps, telephones, etc. may be electrically connected by the use of the usual attachment plug. It has also been proposed to manufacture this type of molding in units or standard lengths which are installed in end to end relation. In this type of molding arrangement it is necessary to provide means for connecting the ends of the wires or other conductors of adjoining molding units. Furthermore, as the units are preferably of a standard length, for example three feet, and as the lengths of the walls against which the units are installed are not usually in exact multiples of three feet, it is frequently necessary to cut one of the standard units to a shorter length in order properly to fit the molding around the wall of the room.

It is among the objects of our present invention to provide an electrical molding which may easily be installed either in old or new buildings, which can be cut to the desired length on the job, which requires no special connecting parts for joining together adjacent molding units, and which, when completely installed, may have a substantially continuous and unbroken outer surface except for the outlet openings. Other objects of our invention include: the provision of an electrical molding unit which is particularly well adapted to be manufactured by the extrusion process from electrically insulating plastic materials such as ethyl cellulose, polystyrene resins, etc.; the provision of an electrical molding in which standard solid wire, either bare or insulated, may be used as the electric conductors; the provision of an electrical molding unit in which the electrical conductors are substantially completely enclosed and may be easily inserted into the molding after it is cut into the desired unit lengths; the provision of an electrical molding unit which does not require any auxiliary connector members to join two adjacent units together and which can be shortened to any desired length by merely sawing or otherwise cutting the molding unit at the desired point; the provision of an improved method of shortening unit lengths of electrical molding; and the provision of electrical molding units which are especially adapted to economical manufacture and installation and which, when installed, are safe, rugged and attractive in appearance.

The above and other objects of our invention will appear from the following description of one form of our improved molding, reference being had to the accompanying drawings in which:

Figure 1 is a perspective view, not to exact scale, illustrating our molding as applied to an inside corner at the base of the walls of a building.

Figure 2 is a detached elevational view of a series of our molding units connected in end to end relation to provide a multiple outlet molding and having a cover member extending the full length of the molding to provide an unbroken outer surface therefor.

Figure 3 is a front elevational view of one of our molding units, the cover member being removed, illustrating the conductors in withdrawn position and an end of the molding partially cut off to shorten the unit.

Figure 4 is a view similar to Figure 3 but showing the molding unit in shortened condition with the conductors returned to their normal positions.

Figure 5 is a transverse cross sectional view taken on line 5—5 of Figure 4.

Figure 6 is a detached view of the end of one of the electrical conductors for our molding units having a socket member formed integrally thereon.

Figure 7 is an end view of the socket member shown in Figure 6.

Figure 8 is a fragmentary view of a section of our assembled molding, the cover being in place and a pair of outlet openings being shown in the cover.

Figure 9 is a view generally similar to Figure 8 but showing a connector plug in position in the outlet.

Figure 10 is a fragmentary enlarged front elevational view of a section of one of our molding units showing the arrangement of the connector clips, the molding cover being removed.

Figure 11 is a transverse cross sectional view taken substantially on line 11—11 of Figure 9 and illustrating the engagement of the conductor plug prongs with the connector clips which are carried by the molding.

Figure 12 is a detached plan view of one of our connector clips showing its engagement with one of the molding conductor wires.

Figure 13 is a side elevation of the clip and wire shown in Figure 12.

Figure 14 is a view generally similar to Figure 6 but illustrating an alternate form of conductor socket member.

Figure 15 is an end view of the socket member shown in Figure 14.

Figure 16 is an enlarged transverse cross sectional view illustrating the manner in which the molding body members are attached to the building structure and indicating the relatively loose fit of the conductors or wires in the molding unit.

As noted above, prior electrical molding units have been proposed which are adapted to be sawed off or otherwise shortened to facilitate fitting a molding completely around the walls of a room. Prior to our invention however all electrical moldings with which we are familiar, and which were adapted to be cut off to shorter lengths, required additional connecting sections, pins or other separate elements which had to be inserted between adjacent units to secure them together and make proper electrical connections therebetween.

Our present invention provides an electrical molding in which each of the conductors or wires for carrying electric current therethrough is provided with a socket member at one end and projects from the molding unit to form a prong at the opposite end. The socket members have their outer open prong receiving ends substantially flush with the end of the molding unit and the conductor wires are supported in the molding body in such a manner that they may be moved longitudinally thereof to withdraw the projecting prong ends of the conductors into the molding body and cause the opposite socket ends of the conductors to project correspondingly from the molding unit. When this has been done the molding can be sawed or otherwise cut through to provide a short section of any desired length. After the cutting operation it is only necessary to move the conductors back to their original positions with their socket ends thereof flush with the end of the molding. When this is done the opposite ends of the conductors will project out from the newly cut end of the short unit to form a new pair of prongs which may be used to connect adjoining units as will be later described.

Referring particularly to Figure 1, one of our molding units with the cover removed is indicated generally at B. As previously noted the body and cover members are preferably formed by extrusion from a suitable electrically insulating material. The body or conductor carrying portion 1 is preferably of generally V-shaped cross-section (see Figure 16) and is provided with a pair of spaced longitudinally extending tubular apertures 2 and 3 disposed respectively in the opposite arms of the V-shaped body. Electrical conductors, which in the illustrated form of our invention are shown as bare solid wires 4 and 5, are inserted into the tubular apertures 2 and 3. These wires are sufficiently smaller in diameter than the apertures 2 and 3 to permit the wires to be readily inserted during assembly of the units and to be moved lengthwise, as will be more fully described later, if it is desired to shorten one of the units.

The ends of the wires 2 and 3 which are at one end of the body 1 are provided with socket members of generally circular cross-section and adapted to give a good electrical connection between adjacent units when the projecting prong ends 4$^b$ and 5$^b$ of the conductors 4 and 5 of an adjacent unit are inserted therein. As seen in Figures 3, 6 and 7 the socket members 4$^a$ and 5$^a$ are formed integrally from the body of the wires 2 and 3, as by a simple flattening and bending operation, to provide an open sided socket or receptacle. Figures 14 and 15 illustrate an alternative form of socket member on the end of one of the conductors. This comprises a split, thin metal, tubular socket 17 which may be secured to the conductor 18 as by soldering at 19. The slots 20 extend inwardly from the open end of the socket 17 and provide a resilient spring grip on the projecting prong on an adjacent molding unit. Preferably the outer diameter of the socket ends of the conductors, whether the type shown in Figure 6 or that shown in Figure 14 be employed, is such that a rather snug fit is provided in the tubular apertures 2 and 3 of the body 1. Thus when the socket members are pushed into body 1 until the open ends of the sockets are substantially flush with the end of the body, the conductor wires will be retained in proper position although they fit relatively loosely in the tubular apertures.

The projecting opposite ends of the conductors 4 and 5 form prongs 4$^b$ and 5$^b$ which, as seen in Figure 1, permit end to end joining of adjacent molding units by merely inserting the prongs 4$^b$ and 5$^b$ of one unit into the sockets 4$^a$ and 5$^a$ of the adjacent unit. Spaced holes 6 extend through the base of the V-shaped cross section of the elongated body member 1 to facilitate attaching the molding to the wall by screws or the like 7 as shown in Figure 16. Washers 8, preferably of a resilient material, may be placed between the heads of the screws 7 and the molding.

In the illustrated embodiment of our invention each of our molding units is provided with a single pair of connector clips generally indicated at C and C' in Figure 1. These clips, in cooperation with the cover member 10 provide a standard type electrical outlet for receiving the prongs of a connector plug and, although we have illustrated each of our molding units as having only one pair of clips to provide a single electrical outlet it will be understood that each unit length may be provided with two or more pairs of clips if a larger number of outlets is desired.

In Figure 1 an inside corner element 9 is illustrated. This element has the same outer end contours as the adjacent molding and is provided with spaced electrical conductors which extend around the corner within the unit. These conductors are provided with socket members at the left hand (as seen in Figure 1) end of the corner piece and with prongs projecting from the right hand end thereof. It will be understood that outside corner pieces will also be provided to facilitate extending the molding around outside corners. The prongs of corner member 9 have been inserted into the socket members 4$^a$ and 5$^a$ of the conductors in the body member 1 of the molding unit which is indicated as a whole at B. The other ends of the conductors 4 and 5 in the body 1 form projecting prongs 4$^b$ and 5$^b$ which, in continuing the installation of the molding, will be inserted into the sockets 4$^a$ and 5$^a$ of the next adjacent unit. The left hand side of Figure 1 shows a joint between two of our molding units B' and B", the cover member 10 being attached thereto but being broken away at the joint between the two units B' and B" for better illustration. It will be noted that the unit B" is shorter than the standard length unit as shown on the right hand side of Figure 1 having been cut off at 11 adjacent the pair of connector plug apertures 12.

It will be understood that it is impossible to select a standard length of molding unit which would fit in even multiples along any particular length of wall and therefore it is usually necessary to cut off the end unit of a series to proper length to either fit a corner member such as shown at 9 or an end member, not illustrated, but which may be any type of protective cover to fit over the ends of the conductors to prevent accidental contact therewith.

As is best seen in Figure 11, the outer edges of the body member 1 are provided with flanges 13 and 14 which are engaged by the inwardly curved lips 15 and 16 of the cover member 10. This cover member 10 is also preferably made of extruded plastic material and has sufficient resiliency or spring so that it may be snapped into position over the flanges 13 and 14 after the body members 1 are all installed in position along the wall. The cover 10 is preferably made in several standard lengths such as six feet, nine feet and twelve feet. Thus, to cover a length of assembled body units eleven feet long, a twelve foot section of cover member would be cut to proper length and snapped into position over the flanges 13 and 14. The connector plug apertures 12 are spaced along the cover member 10 to coincide and align with the pairs of connector clips C and C'. By aligning one end of a length of cover strip 10 with the end of one of the full length body units 1 each set of apertures 13 of the cover strip will be automatically positioned in proper relation to a corresponding set of connector clips C—C'. Furthermore, even though a shortened molding body unit is used at the end of a series, as shown in Figure 1, the apertures 12 in the cover strip will automatically be aligned with the connector clips thereof.

Figures 10, 12 and 13 illustrate one arrangement for securing the connector clips C and C' to the conductors 4 and 5. The inner walls of the tubular apertures 2 and 3 of the body 1 are cut away as seen at 21 and 22 in Figure 10 and the conductor engaging sleeve portions 23 and 24 of the clips C and C' are placed therein. These sleeve portions of the conductor clips, as is seen in Figures 12 and 13, may be tapered to facilitate entry of the ends of the wires 4 and 5 during assembly of the unit. The clips are preferably made of a spring material having sufficient resiliency so that when the small ends of the sleeves 23 or 24 are made of slightly smaller diameter than the diameter of the wires 4 or 5 a good electrical contact will be made between the clips and the wires while permitting relatively sliding movement of the wires in the sleeve portions of the clips. It will also be noted that, as the sleeve portions 23 and 24 of the connector clips are disposed in the cut out portions 21 and 22 of the molding body 1, the conductors 4 and 5 can be moved longitudinally in the tubular apertures 2 and 3 without substantially moving the clips C and C' relative to the molding itself. Other types of resilient connecting means may, of course, be employed for attaching the clips C—C' to their respective conductor wires.

It has been pointed out above that one of the important features of our invention is the provision of electrical molding units which can be connected together end to end without the use of any intermediate auxiliary connecting device or element and which will permit cutting of a standard length unit to a shorter length in a very convenient and simple matter. Referring to Figures 3 and 4, the body 1 of one of our molding units is illustrated with the socket ends 4ª and 5ª of the conductors 4 and 5 projecting from the end of the body 1 a distance equal to the distance that the prong ends 4ᵇ and 5ᵇ normally project from the opposite end of the body 1 while the prong ends 4ᵇ and 5ᵇ are shown as having been pushed back into the body 1 until they are flush with the right hand end thereof. This operation can conveniently be accomplished by merely placing the projecting prong ends of a unit against a surface and pushing the body member 1 toward the surface until the ends 4ᵇ and 5ᵇ are flush with the end of the body. The socket ends 4ª and 5ª will simultaneously be moved to the left as seen in Figure 3 a distance equal to the distance which the prongs 4ᵇ and 5ᵇ normally project to the right. Now, to shorten the molding unit it is only necessary to cut it at the desired distance back from the right hand end thereof, for example at 25 which indicates a saw cut extending partially through the body. When the unit is sawed off as at 24 the conductors 4 and 5 will also be cut off. To complete the shortened unit it is only necessary to push the projecting socket ends 4ª and 5ª back into the tubular apertures 2 and 3 to their original position. This will cause the opposite ends of the conductors 4 and 5 to project out from the opposite end of the body 1 to form new prongs, indicated at 4ᶜ and 5ᶜ in Figure 4, of exactly the right length to engage the sockets of an adjoining molding unit.

Thus our standard length molding units can be shortened in an extremely simple and foolproof manner by merely sawing through the unit at the desired point. The procedure outlined above automatically provides for a new set of projecting prongs of exactly the proper length. When the conductors 4 and 5 are being moved in the body 1 as described above they will merely slide through the sleeve portions 23 and 24 of the clips C and C' without interfering with the electrical connection therebetween. Clips C and C' will maintain their proper positions in the body 1 because they are held in place in the cut out portions 21 and 22 of the body.

In addition to the sleeve portion 24 the clip C has a base section 26 and a bent spring connector plug prong engaging member 27. The base 26 serves to retain the clip in proper position in the body 1 while the spring contact member 27 provides a firm engagement with the prongs of a connector plug. Clip C' is similarly formed.

We have described our improved molding sections as each being provided with one or more sets of connector clips C—C'. However it will be understood by those skilled in the art that the advantages of our slidable conductor molding sections may be obtained although the clips C—C' are omitted and separate outlet units are inserted between any two molding sections. Such outlet units would preferably be of short length and include a suitable outlet for a connector plug and also be provided with conductor sockets at one end and prongs at the other end so that they could be inserted between any two molding units. With such an arrangement the short outlet sections could be located only where desired and would, of course, not necessarily have to be disposed between each two adjoining unit lengths of molding.

Our molding may be connected into the electrical wiring system of the building in which it is installed either by wires extending from the building system to a connector plug which is inserted in one of the outlets of the molding or by drilling through one of the molding body units and running wires from the conductors in the unit through the wall to the building wiring system.

From the above description of one form of our invention it will be seen that we have developed an electrical molding which, when provided with integral outlets, may be used to provide a series of outlets at regularly spaced intervals or which, when the integral outlets are omitted and separate outlet units employed, may be used as a convenient means for housing electrical conductors and providing outlets at any desired locations. Our present invention greatly simplifies the installation of this type of molding and, as it is readily susceptible to manufacture by the extrusion process and requires a minimum of additional work after extrusion to complete the molding units, it is economical both from the manufacturing and installation points of view.

It will be understood that variations and modifications may be made in the arrangement and proportions of the parts making up our molding and we do not therefore wish to be limited to the particular construction herein shown and described but claim as our invention all embodiments thereof coming within the scope of the appended claims.

We claim:

1. A multiple outlet molding unit of the type described comprising an elongated one-piece body member formed of electrically insulating material, said body having spaced tubular conductor apertures extending the entire length thereof, conductors disposed in said apertures for sliding longitudinal movement therein, one end of each conductor having a connector socket thereon, said sockets being normally disposed within said apertures, the opposite end of each conductor projecting beyond the body to form a connector prong, and a pair of connector plug engaging clips disposed in spaced opposed relation in said body, one of said clips being connected to each of said conductors with a sliding connection, and means for holding said clips substantially stationary during sliding movement of said conductors in said apertures.

2. A multiple outlet molding unit of the type described including an elongated plastic body of generally V-shaped cross section, said body having spaced tubular apertures running the entire length thereof, one of said apertures being disposed in one arm of the V-shaped cross section of said body and the other aperture being disposed in the opposite arm of the V-shaped cross section of said body, electrical conductors disposed in said apertures, said conductors being smaller in cross section than said apertures whereby said conductors may be moved longitudinally in said apertures, a socket member at one end of each of said conductors, said socket members being normally housed in said apertures with their outer ends substantially flush with the adjacent end of said body, the other end of each of said conductors projecting from the opposite end of said body to form a connecting prong adapted to engage a socket member on an adjacent molding unit, connector clip members slidably secured to said conductors and disposed substantially within the V-shaped cross section of said body, the walls of said tubular apertures having openings permitting said clips to be secured to said conductors, and a removable plastic cover member for said body, said cover having connector plug apertures positioned to align with said clips when the ends of said cover and said body are aligned.

THOMAS S. GERSPACHER.
FREDERICK A. MAYNARD.

REFERENCES CITED

The following references are of record in the file of this patent:

UNITED STATES PATENTS

| Number | Name | Date |
|---|---|---|
| 2,175,145 | Davison | Oct. 3, 1939 |
| 2,269,779 | Morten | Jan. 13, 1942 |
| 2,274,087 | Morten | Feb. 24, 1942 |
| 2,292,394 | O'Brien | Aug. 11, 1942 |